(12) United States Patent
Guo

(10) Patent No.: US 8,108,447 B2
(45) Date of Patent: Jan. 31, 2012

(54) SYSTEMS AND METHODS FOR GARBAGE COLLECTION IN DEDUPLICATED DATA SYSTEMS

(75) Inventor: Fanglu Guo, Los Angeles, CA (US)

(73) Assignee: Symantec Corporation, Mountain View, CA (US)

(*) Notice: Subject to any disclaimer, the term of this patent is extended or adjusted under 35 U.S.C. 154(b) by 173 days.

(21) Appl. No.: 12/722,192

(22) Filed: Mar. 11, 2010

(65) Prior Publication Data

US 2011/0225214 A1   Sep. 15, 2011

(51) Int. Cl.
*G06F 17/30* (2006.01)

(52) U.S. Cl. ........ 707/816; 707/813; 711/133; 711/159; 711/170

(58) Field of Classification Search .................. None
See application file for complete search history.

(56) References Cited

U.S. PATENT DOCUMENTS

| | | | | |
|---|---|---|---|---|
| 4,775,932 A * | 10/1988 | Oxley et al. ................ | 1/1 |
| 5,530,854 A * | 6/1996 | Emery et al. .............. | 1/1 |
| 5,561,785 A * | 10/1996 | Blandy et al. ............. | 711/170 |
| 6,463,503 B1 * | 10/2002 | Jones et al. ............... | 711/114 |
| 7,584,338 B1 * | 9/2009 | Bricker et al. ............ | 711/162 |
| 7,743,276 B2 * | 6/2010 | Jacobson et al. .......... | 714/6.32 |
| 2006/0190697 A1 * | 8/2006 | Grant ......................... | 711/170 |
| 2007/0033376 A1 * | 2/2007 | Sinclair et al. ............ | 711/203 |
| 2007/0094316 A1 * | 4/2007 | Rodriguez et al. ....... | 707/205 |
| 2008/0005141 A1 | 1/2008 | Zheng et al. | |
| 2008/0005201 A1 | 1/2008 | Ting et al. | |
| 2008/0250213 A1 * | 10/2008 | Holt ........................... | 711/159 |
| 2008/0282045 A1 * | 11/2008 | Biswas et al. ............. | 711/159 |
| 2011/0055471 A1 * | 3/2011 | Thatcher et al. .......... | 711/114 |

FOREIGN PATENT DOCUMENTS

EP 2042980 4/2009

OTHER PUBLICATIONS

International Search Report and Written Opinion received in PCT Application No. PCT/US2010/062187 on Mar. 31, 2011.

* cited by examiner

*Primary Examiner* — Hung Le
(74) *Attorney, Agent, or Firm* — Advantedge Law Group

(57) ABSTRACT

A computer-implemented method for garbage collection in deduplicated data systems may include: 1) identifying a deduplicated data system, 2) identifying at least one segment object added to the deduplicated data system during a garbage-collection process of the deduplicated data system, 3) locking the segment object to prevent removal of the segment object by the garbage-collection process, and 4) unlocking the segment object after the garbage-collection process. The method may allow a small possibility of incorrectly removing useful segment objects. The method may also verify data objects during the garbage-collection process and recover incorrectly removed segment objects. Various other methods, systems, and computer-readable media are also disclosed.

20 Claims, 9 Drawing Sheets

SYSTEMS AND METHODS FOR GARBAGE COLLECTION IN DEDUPLICATED DATA SYSTEMS

BACKGROUND

Deduplicated data systems are often able to reduce the amount of space required to store files by recognizing redundant data patterns. For example, a deduplicated data system may reduce the amount of space required to store similar files by dividing the files into data segments and storing only unique data segments. In this example, each deduplicated file may simply consist of a list of data segments that make up the file.

While conventional deduplicated data systems may reduce the space required to store files, the mechanisms used by such conventional systems to manage deduplicated data may present unwanted limitations. For example, since more than one file may reference any given data segment, the data segments that make up a file cannot simply all be removed when the file is deleted. In order to safely delete data segments, a deduplicated data system must distinguish between referenced and unreferenced data segments.

Unfortunately, in some cases a newly added referenced data segment may temporarily appear unreferenced and may therefore be inappropriately deleted. For example, when a deduplicated data system receives a new file, the deduplicated data system may first receive data segments that make up the file and then receive the file itself (e.g., the deduplicated data system may require that the data segments exist before the file can reference them). If a garbage collection subsystem of a deduplicated data system examines the new data segments before observing the new file itself, the deduplicated data system may delete the new data segments.

In some cases, conventional deduplicated data systems may attach a temporary indicator to all newly added data segments in order to ensure that data segments are not prematurely removed. Unfortunately, this solution suffers from a number of deficiencies. For example, adding temporary indicators to all newly added data segments (and then subsequently removing the indicators when the corresponding files are added) may impose a significant performance overhead. Furthermore, this solution may be incompatible with some implementations of a garbage collection subsystem (such as a mark-and-sweep approach or a reference-count approach). Accordingly, the instant disclosure identifies a need for systems and methods for efficiently performing garbage-collection operations in deduplicated data systems.

SUMMARY

As will be described in greater detail below, the instant disclosure generally relates to systems and methods for improving garbage-collection operations in deduplicated data systems by minimizing the number of newly added data segments (e.g., segment objects) wrongly deleted by locking segment objects added to a deduplicated data system during a garbage-collection process. In one example, one or more of the various systems described herein may accomplish this task by: 1) identifying a deduplicated data system, 2) identifying at least one segment object added to the deduplicated data system during a garbage-collection process of the deduplicated data system, 3) locking the segment object to prevent removal of the segment object by the garbage-collection process, and then 4) unlocking the segment object after the garbage-collection process.

The systems described herein may identify a segment object added to the deduplicated data system during a garbage-collection process in a variety of ways and in a variety of scenarios. In one example, the systems described herein may identify a segment object when the segment object is created within the deduplicated data system. Additionally or alternatively, these systems may identify a segment object by identifying a new reference to the segment object within the deduplicated data system.

In one example, the systems described herein may identify the segment object by monitoring the deduplicated data system for new data segments once the garbage-collection process begins. In this example, these systems may terminate monitoring of the deduplicated data system once the garbage-collection process is complete.

In some examples, the systems described herein may lock the segment object by adding a reference to the segment object to a locked segment object map. In these examples, the systems described herein may subsequently unlock the segment object after the garbage-collection process is complete by clearing the locked segment object map, deleting the locked segment object map, and/or removing the reference to the segment object from the locked segment object map.

In some examples, the systems described herein may also: 1) identify an additional segment object added to the deduplicated data system before the garbage-collection process, 2) determine, as a part of the garbage-collection process, that the additional segment object is unreferenced within the deduplicated data system, and then 3) remove the additional segment object based on the determination. These systems may also: 1) identify a data object added to the deduplicated data system after the additional segment object was added, 2) determine that the data object references the additional segment object, and then 3) retrieve another copy of the additional segment object.

In some examples, the systems described herein may also: 1) identify at least one data object added to the deduplicated data system during the garbage-collection process, 2) lock the data object to prevent removal of the data object by the garbage-collection process, and then 3) unlock the data object after the garbage-collection process.

As will be explained in greater detail below, by locking segment objects added during a garbage-collection process, the systems and methods described herein may prevent unwanted deletions of segment objects whose corresponding data objects have yet to be added to a deduplicated data system. Furthermore, these systems and methods may recover unwanted deletions in those boundary cases in which segment objects are deleted because: 1) the segment objects were added to the deduplicated data system before a garbage-collection process began and 2) a corresponding data object was not added until after the garbage-collection process had already started. As such, the systems and methods described herein may efficiently prevent unwanted deletions during garbage-collection operations in a large number of cases, and potentially perform more costly recoveries of unwanted deletions in a relatively small number of boundary cases.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
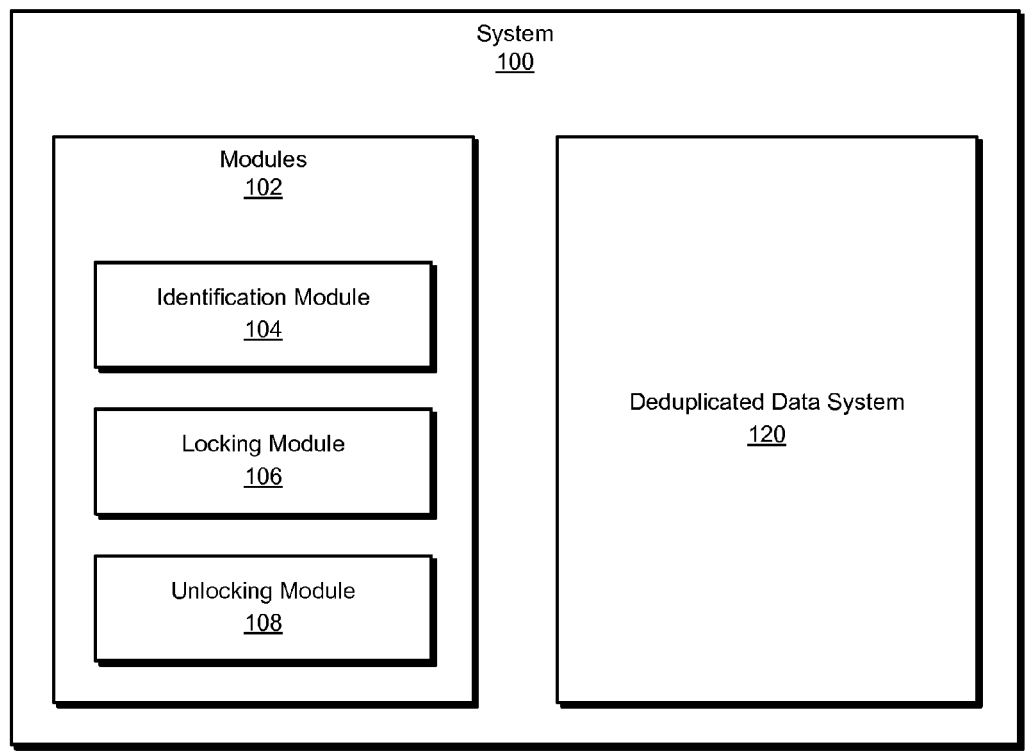
FIG. 1 is a block diagram of an exemplary system for garbage collection in deduplicated data systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for garbage collection in deduplicated data systems. In one example, and as will be described in greater detail below, the various systems described herein may accomplish this task by: 1) identifying a deduplicated data system, 2) identifying at least one segment object added to the deduplicated data system during a garbage-collection process of the deduplicated data system, 3) locking the segment object to prevent removal of the segment object by the garbage-collection process, and then 4) unlocking the segment object after the garbage-collection process.

Figure 2:
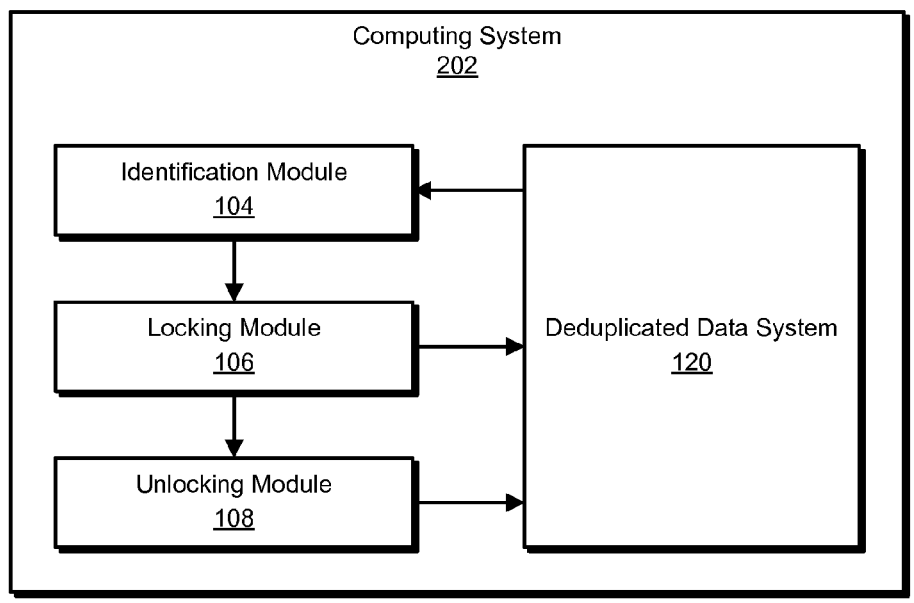
FIG. 2 is a block diagram of an exemplary system for garbage collection in deduplicated data systems.
Figure 4:
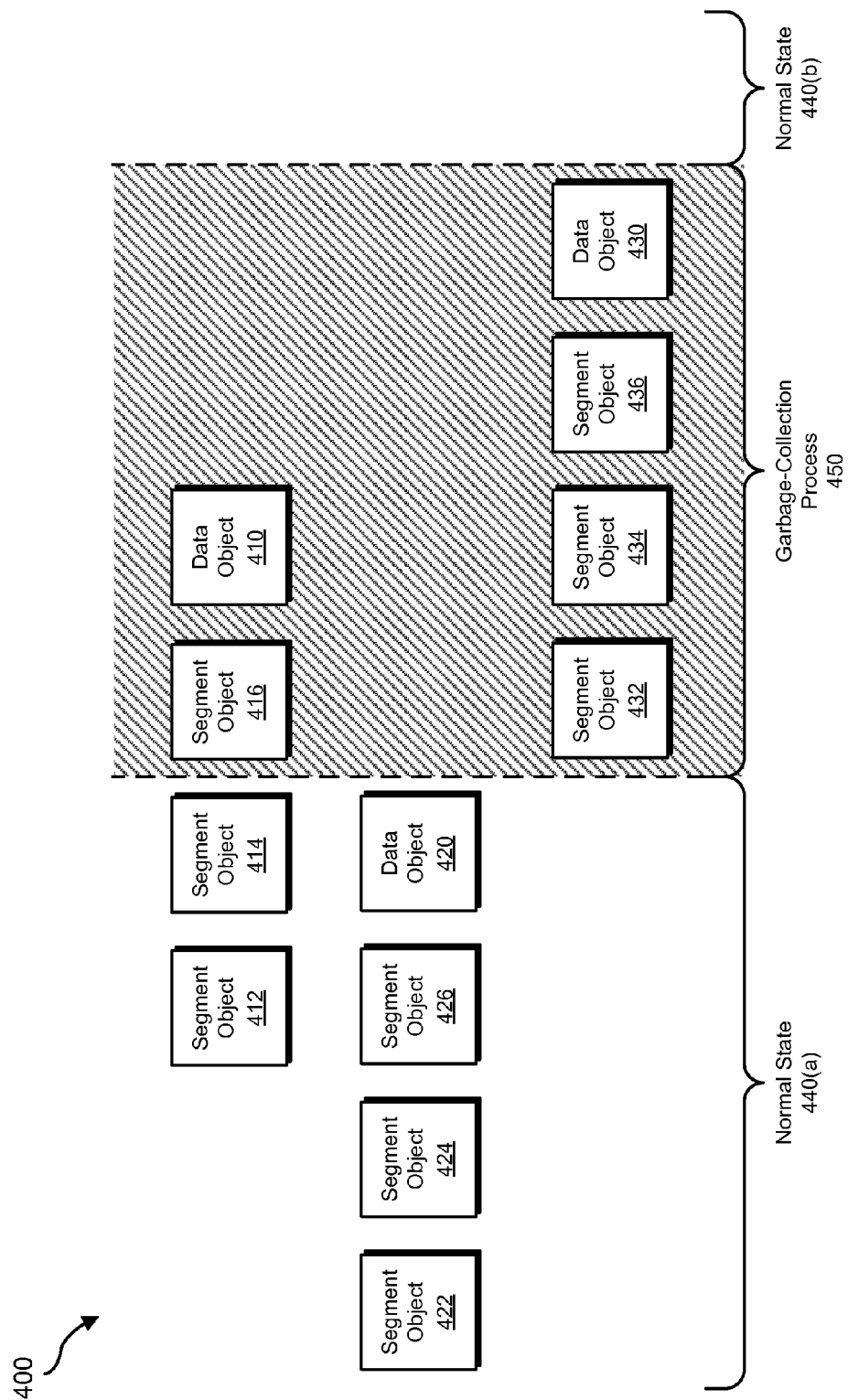
FIG. 4 is an illustration of an exemplary timeline of an exemplary system for garbage collection in deduplicated data systems.
Figure 5:
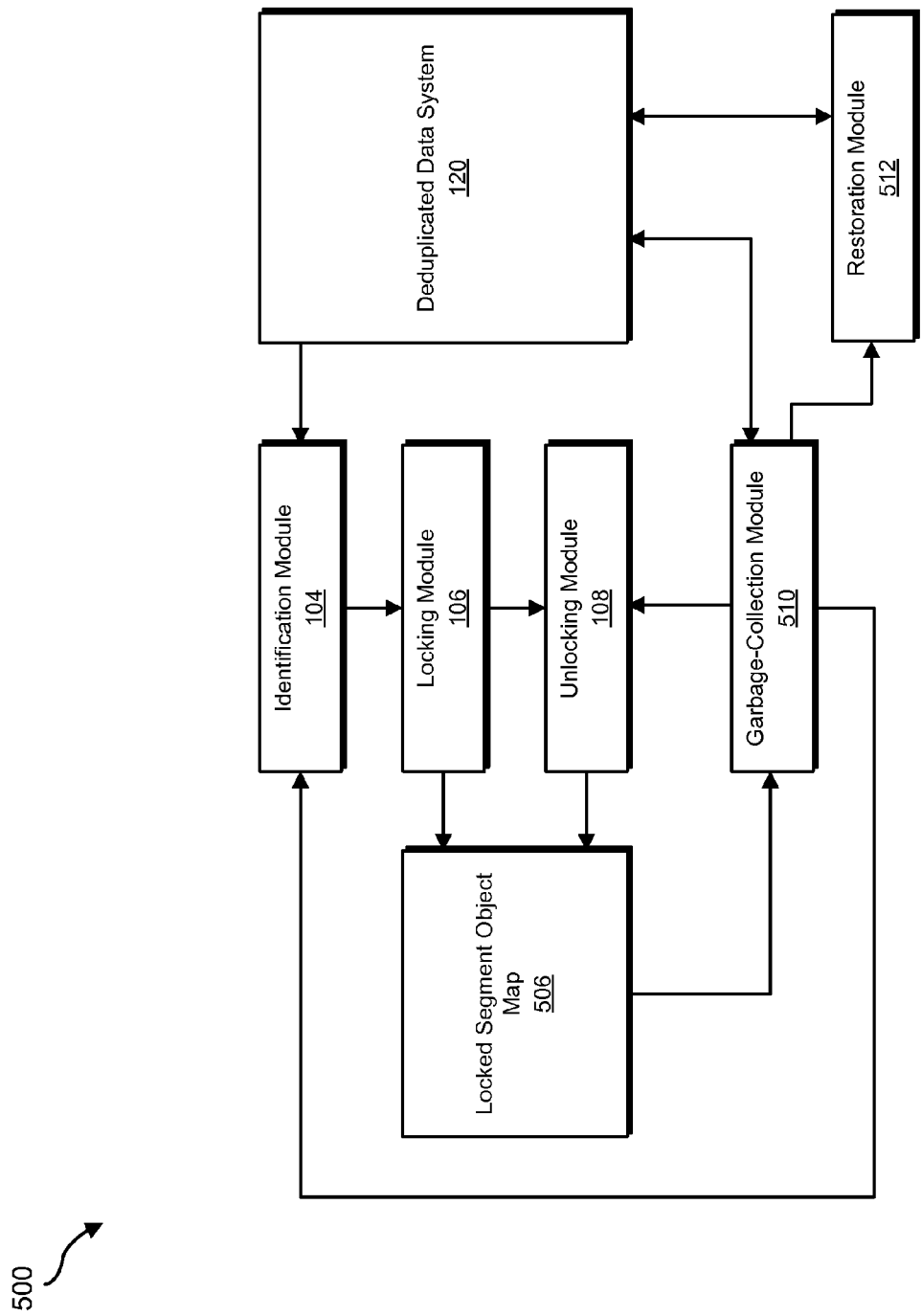
FIG. 5 is a block diagram of an exemplary system for garbage collection in deduplicated data systems.

The following will provide, with reference to FIGS. 1, 2, and 5, detailed descriptions of exemplary systems for garbage collection in deduplicated data systems. Detailed descriptions of corresponding computer-implemented methods will also be provided in connection with FIGS. 3, 4, 6, and 7. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for garbage collection in deduplicated data systems. As illustrated in this figure, exemplary system 100 may include one or more modules 102 for performing one or more tasks. For example, and as will be explained in greater detail below, exemplary system 100 may include an identification module 104 programmed to identify at least one segment object added to a deduplicated data system during a garbage-collection process of the deduplicated data system. Exemplary system 100 may also include a locking module 106 programmed to lock the segment object to prevent removal of the segment object by the garbage-collection process.

In addition, and as will be described in greater detail below, exemplary system 100 may include an unlocking module 108 programmed to unlock the segment object after the garbage-collection process is complete. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202), computing system 810 in FIG. 8, and/or portions of exemplary network architecture 900 in FIG. 9. One or more of modules 102 in FIG. 1 may also represent all or portions of one or more special-purpose computers configured to perform one or more tasks.

As illustrated in FIG. 1, exemplary system 100 may also include a deduplicated data system 120. Deduplicated data system 120 may represent portions of a single storage system or computing device or a plurality of storage systems or computing devices. For example, deduplicated data system 120 may represent a portion of computing system 202 in FIG. 2, computing system 810 in FIG. 8, and/or portions of exemplary network architecture 900 in FIG. 9. Alternatively, deduplicated data system 120 in FIG. 1 may represent one or more physically separate devices capable of being accessed by a computing device, such as computing system 810 in FIG. 8 and/or portions of exemplary network architecture 900 in FIG. 9.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202 with deduplicated data system 120. In one embodiment, and as will be described in greater detail below, modules 102 from FIG. 1 may program computing system 202 to: 1) identify a deduplicated data system, 2) identify at least one segment object added to the deduplicated data system during a garbage-collection process of the deduplicated data system, 3) lock the segment object to prevent removal of the segment object by the garbage-collection process, and 4) unlock the segment object after the garbage-collection process.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 810 in FIG. 8, or any other suitable computing device.

Figure 3:
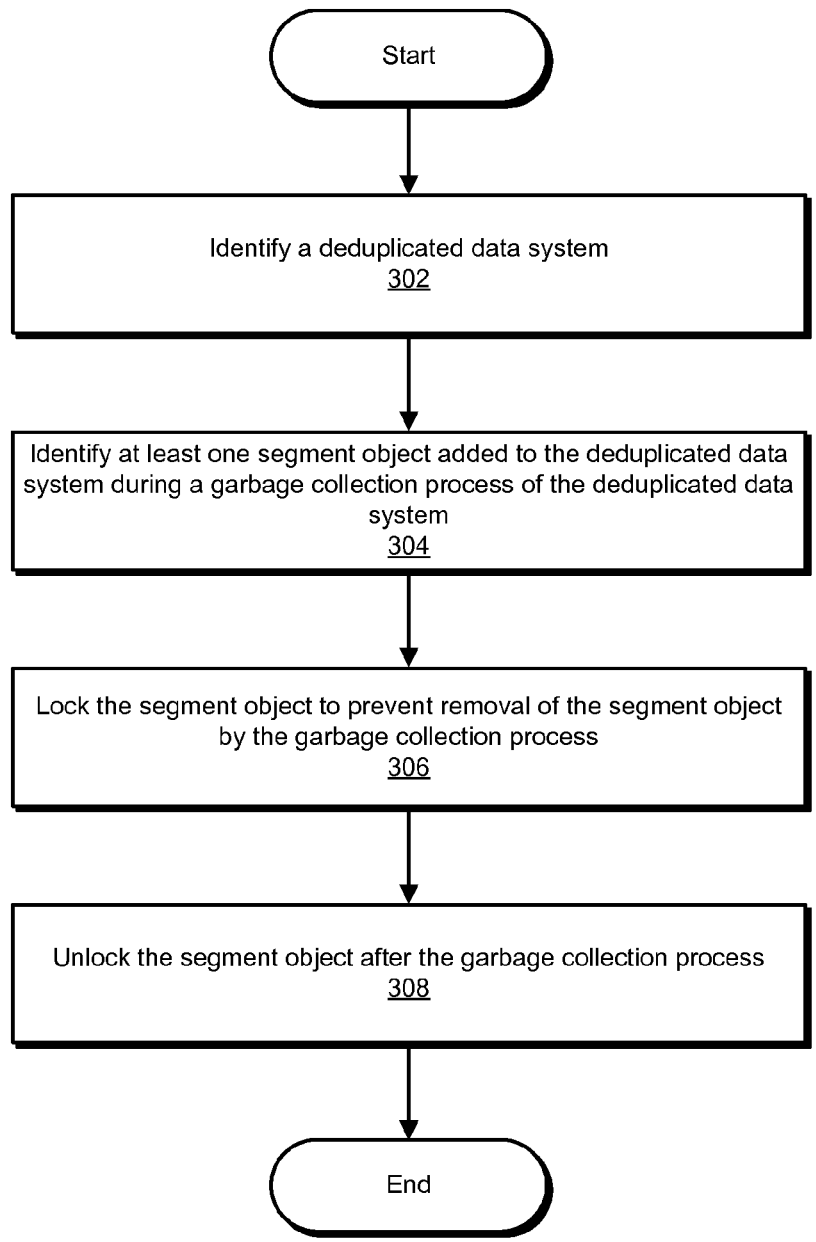
FIG. 3 is a flow diagram of an exemplary method for garbage collection in deduplicated data systems.

FIG. 3 is a flow diagram of an exemplary computer-implemented method 300 for garbage collection in deduplicated data systems. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a deduplicated data system. For example, at step 302 identification module 104 may, as part of computing system 202 in FIG. 2, identify deduplicated data system 120. The phrase "deduplicated data system," as used herein, generally refers to storage systems that reduce redundant data by only storing a single instance of data (e.g., a segment object), potentially referencing each data instance multiple times. An example of a deduplicated data system may include SYMANTEC's NETBACKUP PUREDISK. As will be described in greater detail below, a single instance of data may be referenced by a single data object (e.g., a file) or a plurality of data objects within this deduplicated data system.

Identification module 104 may perform step 302 in any suitable manner. In one example, identification module 104 may identify the deduplicated data system by reading a configuration file associated with the deduplicated data system. Additionally or alternatively, identification module 104 may identify the deduplicated data system by identifying (e.g., intercepting, receiving, or retrieving) an attempt to add new segment objects to the deduplicated data system. In some contexts, identification module 104 may be an extension and/or a component of the deduplicated data system, and may implicitly identify the deduplicated data system simply through the context in which it is executing.

At step 304, one or more of the systems described herein may identify at least one segment object added to the deduplicated data system during a garbage-collection process of the deduplicated data system. For example, at step 304 identification module 104 may, as part of computing system 202 in FIG. 2, identify a segment object added to deduplicated data system 120 during a garbage-collection process of deduplicated data system 120.

FIG. 4 illustrates an exemplary timeline 400 of data objects 410, 420, and 430 being added to a deduplicated data system (preceded by their respective segment objects). In this example, identification module 104 may identify a segment object 432 added to the deduplicated data system during a garbage-collection process 450.

As used herein, the term "segment object" may refer to a segment of data, a block of data, or any other suitable unit of data used for data deduplication. Likewise, the term "data object" may refer to any object (such as a file) that may include and/or refer to one or more segment objects. As used herein, the term "garbage-collection process" may refer to any portion of a process for deleting unreferenced data segments and/or recovering storage space by removing and/or helping to remove unreferenced data segments from a deduplicated data system. In some examples, a "garbage-collection process" may include portions of a mark-and-sweep process and/or a reference-counting process.

Identification module 104 may perform step 304 in a variety of scenarios. For example, identification module 104 may identify the segment object by identifying the creation of the segment object within the deduplicated data system (e.g., a segment object to be referenced by a data object being added, copied, and/or uploaded to the deduplicated data system). Identification module 104 may identify the creation of the segment object in any suitable manner. For example, identification module 104 may receive a communication from the deduplicated data system identifying the creation of the segment object. Additionally or alternatively, identification module 104 may include a portion of a filter driver through which an instruction to create the segment object may pass.

In another scenario, identification module 104 may identify the segment object by identifying a new reference to the segment object within the deduplicated data system. For example, the segment object may initially be referenced by a single data object. Identification module 104 may then identify a new reference to the segment object by an additional data object. If the initial reference is subsequently removed (e.g., the single data object initially referencing the segment object is deleted), and if the garbage-collection process observes that the initial reference is removed without observing the new reference (e.g., because the garbage-collection process analyzed the additional data object before the additional data object referenced the segment object), then, as will be described in greater detail below, the systems described herein may prevent the segment object from wrongful deletion by locking the segment object after identifying the segment object.

Returning to step 304, identification module 104 may identify the segment object added during the garbage-collection process in any suitable manner. For example, identification module 104 may identify the segment object by monitoring the deduplicated data system for new data segments once the garbage-collection process begins. As mentioned earlier, a "garbage-collection process" may include any portion of a process for removing dereferenced data segments. Accordingly, identification module 104 may commence monitoring at various times. For example, identification module 104 may commence monitoring when the deduplicated data system loads a garbage collection daemon. Additionally or alternatively, identification module 104 may commence monitoring directly before the marking stage of a mark-and-sweep process.

In some examples, identification module 104 may also terminate the monitoring of the deduplicated data system for new data segments once the garbage-collection process is complete. For example, identification module 104 may terminate monitoring for new data segments once a garbage collection daemon terminates. Additionally or alternatively, identification module 104 may terminate monitoring directly after the sweep stage of a mark-and-sweep process. In some examples, identification module 104 may reduce the scope of monitoring as a garbage-collection process proceeds. For example, if the garbage-collection process is configured to sweep for unreferenced segment objects region-by-region, identification module 104 may monitor for new data segments added only to those regions that are yet to be swept.

Returning to FIG. 3, at step 306 one or more of the systems described herein may lock the segment object to prevent removal of the segment object by the garbage-collection process. For example, at step 306 locking module 106 may, as part of computing system 202 in FIG. 2, lock the segment object added to deduplicated data system 120 during the garbage-collection process of deduplicated data system 120. In another example, locking module 106 may lock segment object 432 in FIG. 4 to prevent removal of segment object 432 by garbage-collection process 450.

Locking module 106 may perform step 306 in any suitable manner. For example, locking module 106 may lock the segment object by altering permissions to the segment object so that the garbage-collection process cannot delete the segment object. Additionally or alternatively, locking module 106 may include a portion of a filter driver and may intercept any attempts to remove the segment object. In some examples, locking module 106 may instruct the garbage-collection process to ignore the segment object.

In some examples, locking module 106 may lock the segment object by adding a reference to the segment object to a locked segment object map. The locked segment object map may include any suitable data structure for identifying locked segment objects. For example, the locked segment object map may include a bitmap. Using FIG. 5 as an example, an exemplary system 500 may include a locked segment object map 506. In this example, locking module 106 may write to locked segment object map 506 to add a reference to the segment object. As will be described in greater detail below, exemplary system 500 may also include a garbage-collection module 510 that may refer to locked segment object map 506 to identify apparently unreferenced segment objects that may be deleted from deduplicated data system 120.

By locking the segment object, locking module 106 may prevent the garbage-collection process from mistakenly deleting the segment object while the segment object is apparently unreferenced due to a data object that references the segment object being added to the deduplicated data system after the segment object. Using FIG. 4 as an example, data object 430 may reference segment objects 432, 434, and 436. In this example, when adding data object to the deduplicated data system, segment objects 432, 434, and 436 may precede data object 430 so that when data object 430 is added to the deduplicated data system, data object 430 may include the correct references to segment objects 432, 434, and 436. Locking module 106 may lock segment objects 432, 434, and 436 as each is added to the deduplicated data system. Accordingly, if garbage-collection process 450 examines any of these segment objects accounting for data object 430, garbage-collection process 450 may leave these segment objects intact despite not observing that data object 430 references the segment objects.

Returning to FIG. 3, at step 308 one or more of the systems described herein may unlock the segment object after the garbage-collection process. For example, at step 308 unlocking module 108 may, as part of computing system 202 in FIG. 2, unlock the segment object added to deduplicated data system 120 during the garbage-collection process of deduplicated data system 120. In another example, unlocking module 108 may unlock segment object 432 in FIG. 4 after garbage-collection process 450 (e.g., during a normal state 440(b)).

As described above, locking module 106 may lock the segment object in a variety of ways. As such, unlocking module 108 may also unlock the segment object in a variety of ways. For example, unlocking module 108 may unlock the segment object by altering permissions to the segment object so that the garbage-collection process can delete the segment object (e.g., the next time that the garbage-collection process runs). Additionally or alternatively, locking module 106 may include a portion of a filter driver designed to intercept any attempts to remove the segment object, and unlocking module 108 may unload locking module 106. In some examples, unlocking module 108 may clear and/or reverse any instructions sent by locking module 106 to the garbage-collection process.

As described earlier, in some examples locking module 106 may lock the segment object by adding a reference to the segment object to a locked segment object map. Unlocking module 108 may accordingly unlock the segment object by acting on the locked segment object map.

For example, unlocking module 108 may clear the locked segment object map. In this example, the locked segment object map may be empty until the next time the garbage-collection process starts. In another example, unlocking module 108 may delete the locked segment object map. For example, unlocking module 108 delete a file including the locked segment object map and/or deallocate memory used for the locked segment object map. In this example, the locking module 106 may later recreate the locked segment object map when the garbage-collection process next starts. Additionally or alternatively, unlocking module 108 may remove the reference to the segment object from the locked segment object map. For example, unlocking module 108 may clear a bit in a bitmap corresponding to the segment object. Using FIG. 5 as an example, unlocking module 108 may clear, delete, and/or modify locked segment object map 506 in order to unlock the segment object. Upon completion of step 308, exemplary method 300 in FIG. 3 may terminate.

Figure 6:
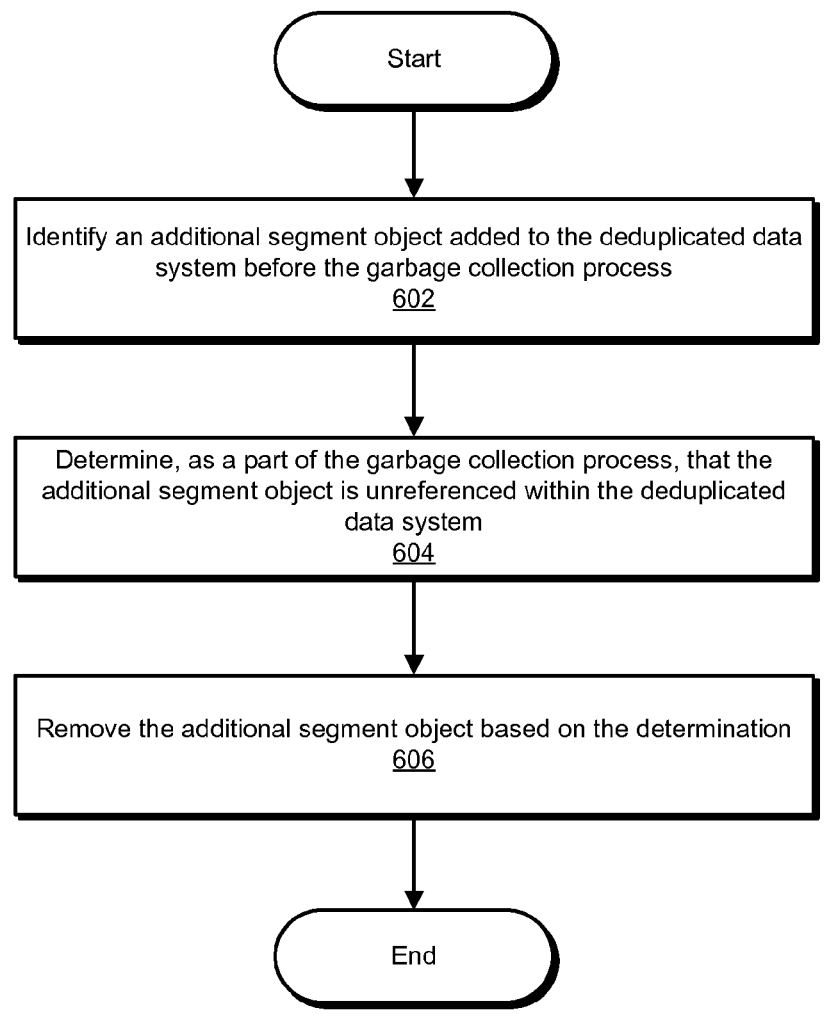
FIG. 6 is a flow diagram of an exemplary method for garbage collection in deduplicated data systems.

FIG. 6 is a flow diagram of an exemplary computer-implemented method 600 for garbage collection in deduplicated data systems. The steps shown in FIG. 6 may be performed by any suitable computer-executable code and/or computing system. In some embodiments, the steps shown in FIG. 6 may be performed by one or more of the components of system 100 in FIG. 1, system 200 in FIG. 2, and/or system 500 in FIG. 5.

As illustrated in FIG. 6, at step 602 one or more of the systems described herein may identify an additional segment object added to the deduplicated data system before the garbage-collection process. For example, at step 602 garbage-collection module 510 may, as part of system 500 in FIG. 5, identify an additional segment object added to deduplicated data system 120 before the garbage-collection process.

Garbage-collection module 510 may perform step 602 in any suitable manner. For example, garbage-collection module 510 may identify the additional segment object during a sweep operation of a mark-and-sweep process. Additionally or alternatively, garbage-collection module 510 may identify the additional segment object while assessing the number of references to the segment object. For example, as illustrated in FIG. 4, garbage-collection module 510 may identify segment object 412 during a normal state 440(a) before garbage-collection process 450.

Returning to FIG. 6, at step 604 one or more of the systems described herein may determine, as part of the garbage-collection process, that the additional segment object is unreferenced within the deduplicated data system. For example, at step 604 garbage-collection module 510 may, as part of system 500 in FIG. 5, determine that the additional segment object is unreferenced within deduplicated data system 120.

Garbage-collection module 510 may determine that the additional data segment is unreferenced in any suitable manner. For example, garbage-collection module 510 may determine that the additional data segment was unmarked in a mark-and-sweep operation. Additionally or alternatively, garbage-collection module 510 may determine that a reference count for the additional data segment is at zero. In some examples, garbage-collection module 510 may observe that the additional data segment does not list any data objects as referencing the additional data segment.

Using FIG. 4 as an example, segment object 412 may evidence no references by a data object during normal state 440(a) since data object 410 (e.g., the only data object to reference segment object 412) may not be added to the deduplicated data system until garbage-collection process 450 is already underway. Accordingly, garbage-collection module 510 may determine that segment object 412 is unreferenced within the deduplicated data system even though the addition of data object 410, which references segment object 412, may be pending.

Returning to FIG. 6, at step 606 one or more of the systems described herein may remove the additional segment object from the deduplicated data system. For example, at step 606 garbage-collection module 510 may, as part of system 500 in FIG. 5, remove the additional segment object from deduplicated data system 120. As an additional example, garbage-collection module 510 may remove segment object 412 in FIG. 4 from the deduplicated data system.

Garbage-collection module 510 may perform step 606 in any suitable manner. For example, garbage-collection module 510 may delete the additional segment object from a storage device.

Referring back to FIG. 4, in some examples garbage-collection module 510 may prematurely remove segment objects 412 and/or 414 from the deduplicated data system (if, e.g., garbage-collection process 450 fails to recognize data object 410 before deleting segment objects 412 and/or 414). However, as will be described in greater detail below, in some examples the systems described herein may later restore these prematurely removed segment objects 412 and/or 414. Upon completion of step 606, exemplary method 600 in FIG. 6 may terminate.

Figure 7:
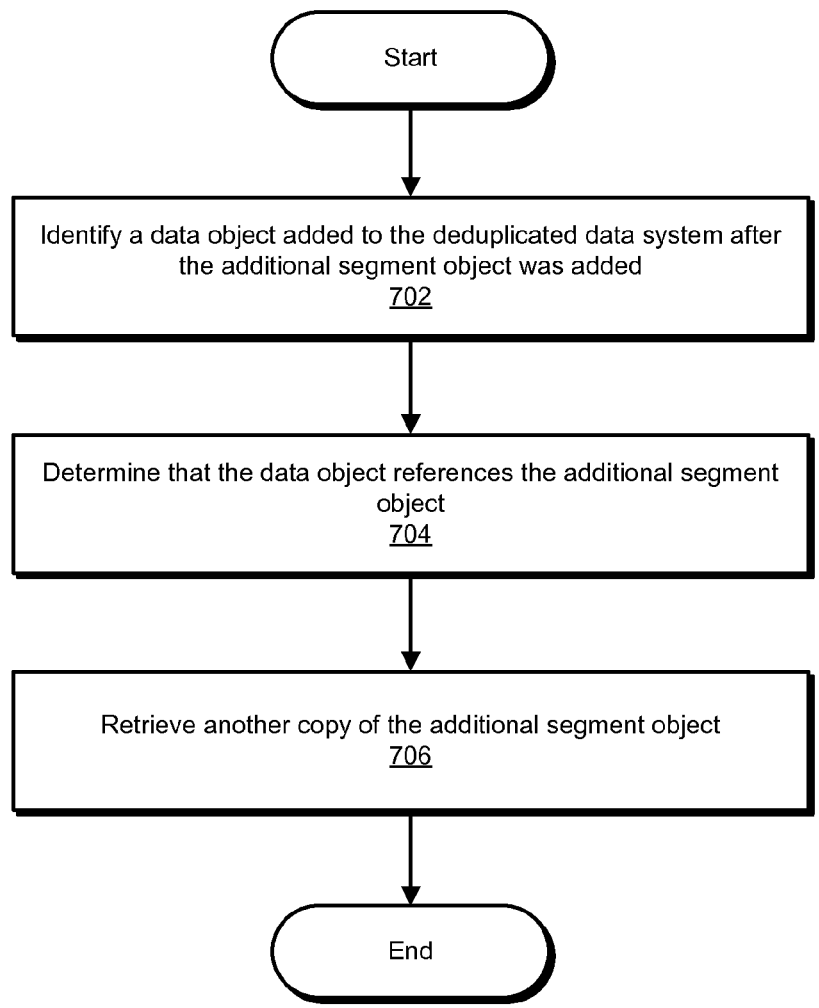
FIG. 7 is a flow diagram of an exemplary method for garbage collection in deduplicated data systems.

FIG. 7 is a flow diagram of an exemplary computer-implemented method 700 for garbage collection in deduplicated data systems. The steps shown in FIG. 7 may be performed by any suitable computer-executable code and/or computing system. In some embodiments, the steps shown in FIG. 6 may be performed by one or more of the components of system 100 in FIG. 1, system 200 in FIG. 2, and/or system 500 in FIG. 5.

As illustrated in FIG. 7, at step 702 one or more of the systems described herein may identify a data object added to the deduplicated data system after the additional segment object was added. For example, at step 702 restoration module 512 may, as part of system 500 in FIG. 5, identify a data object added to deduplicated data system 120 after the additional segment object was added. Using FIG. 4 as an example, restoration module 512 may identify data object 410.

Restoration module 512 may perform step 702 in any suitable manner. For example, restoration module 512 may include a portion of a filter driver that observes the addition of data objects to the deduplicated data system. Additionally or alternatively, restoration module 512 may identify the data object by receiving a communication from the deduplicated data system that identifies the data object.

At step 704, one or more of the systems described herein may determine that the data object references the additional segment object. For example, at step 704 restoration module 512 may, as part of system 500 in FIG. 5, determine that the data object references the additional segment object that was removed from deduplicated data system 120. Using FIG. 4 as an example, restoration module 512 may determine that data object 410 references segment object 412 (and/or, e.g., segment object 414).

Restoration module 512 may perform step 704 in any suitable manner. For example, restoration module 512 may determine that the data object references the additional segment object by receiving a communication from the deduplicated data system that identifies the additional segment object as referenced by the data object. Additionally or alternatively, restoration module 512 may determine that the data object references the additional segment object by attempting to verify that the data object is intact and discovering that the additional segment object has been removed from the deduplicated data system.

At step 706, one or more of the systems described herein may retrieve another copy of the additional segment object. For example, at step 706 restoration module 512 may, as part of system 500 in FIG. 5, retrieve another copy of the additional segment object that was removed from deduplicated data system 120. Using FIG. 4 as an example, restoration module 512 may retrieve another copy of segment object 412 (and/or, e.g., segment object 414).

Restoration module 512 may perform step 706 in any suitable manner. For example, restoration module 512 may retrieve another copy of the additional segment object from a backup. Additionally or alternatively, restoration module 512 may send an error message to a process that attempted to add the data object to the deduplicated data system (resulting, e.g., in the process making another attempt to send the data object and/or the segment objects that the data object references). In some examples, restoration module 512 may recover and/or undelete the additional segment object (e.g., from a deletion heap). Upon completion of step 706, exemplary method 700 in FIG. 7 may terminate.

In some embodiments, systems and methods described herein may also lock data objects added to the deduplicated data system during the garbage-collection process. For example, systems and methods described herein may: 1) identify at least one data object added to the deduplicated data system during the garbage-collection process, 2) lock the data object to prevent removal of the data object by the garbage-collection process, and then 3) unlock the data object after the garbage-collection process.

Since data objects in a deduplicated data system may be referenced by multiple data object collections (e.g., multiple backups), locking a data object during the garbage-collection process may prevent the data object from wrongful deletion. For example a first backup may reference the data object during the garbage-collection process, a second backup may dereference the data object during the garbage-collection process, and the garbage-collection process may account for the dereferencing of the data object without accounting for the referencing of the data object.

Systems and methods described herein may perform the steps mentioned above in any suitable manner. For example, systems and methods described herein may perform the steps mentioned above using any suitable approach described earlier in reference to identifying, locking, and unlocking data segments.

For example, identification module 104 may identify the data object added to the deduplicated data system during the garbage-collection operation by: 1) identifying creation of the data object within the deduplicated data system and/or 2) identifying a new reference to the data object within the deduplicated data system (e.g., by a backup). In some examples, identification module 104 may be programmed to identify the data object by monitoring the deduplicated data system for new data objects once the garbage-collection process begins. Identification module 104 may also be programmed to terminate the monitoring of the deduplicated data system for new data objects once the garbage-collection process is complete. Identification module 104 may perform any of these tasks in any suitable manner, including techniques described earlier with reference to identifying the segment object.

Locking module 106 may be programmed to lock the data object by adding a reference to the data object to a locked data object map. In some examples, the locked data object map may include at least a portion of the locked segment object map (e.g., locking module 106 may use one map for both data objects and segment objects). Locking module 106 may perform this task in any suitable manner, including techniques described earlier with reference to locking the segment object.

Unlocking module 108 may be programmed to unlock the data object after the garbage-collection process by: 1) clearing the locked data object map, 2) deleting the locked data object map, and/or 3) removing the reference to the data object from the locked data object map. Unlocking module 108 may perform any of these tasks in any suitable manner, including techniques described earlier with reference to unlocking the segment object.

As detailed above, by locking segment objects added during a garbage-collection process (e.g., such as segment objects 432, 434, and 436 in FIG. 4), the systems and methods described herein may prevent unwanted deletions of segment objects whose corresponding data objects (e.g., such as data object 430 in FIG. 4) have yet to be added to a deduplicated data system. Furthermore, these systems and methods may recover unwanted deletions in those boundary cases in which segment objects (e.g., such as segment objects 412 and 414 in FIG. 4) are deleted because: 1) the segment objects were added to the deduplicated data system before a garbage-collection process began and 2) a corresponding data object (e.g., such as data object 410 in FIG. 4) was not added until after the garbage-collection process had already started. As such, the systems and methods described herein may efficiently prevent unwanted deletions during garbage-collection operations in a large number of cases, and potentially perform more costly recoveries of unwanted deletions in a relatively small number of boundary cases.

The various systems described herein may be deployed in a variety of ways. For example, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

Figure 8:
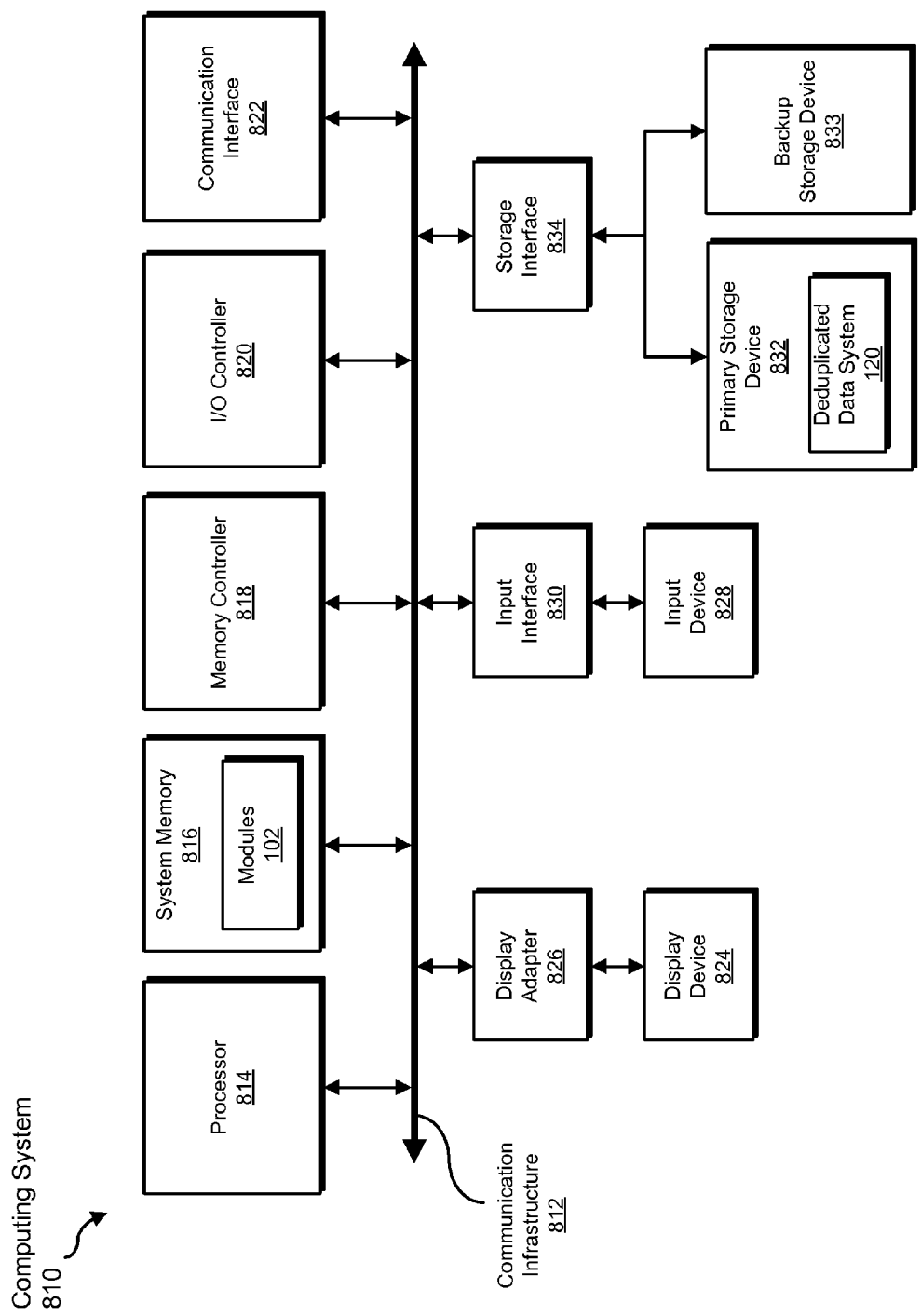
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the identifying, monitoring, terminating, adding, clearing, deleting, removing, determining, and/or retrieving steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an input/output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller 818 may perform and/or be a means for performing, either alone or in combination with other elements, one or more of the steps or features described and/or illustrated herein, such as identifying, monitoring, terminating, adding, clearing, deleting, removing, determining, and/or retrieving.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for performing, either alone or in combination with other elements, one or more of the identifying, monitoring, terminating, adding, clearing, deleting, removing, determining, and/or retrieving steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the identifying, monitoring, terminating, adding, clearing, deleting, removing, determining, and/or retrieving steps disclosed herein. Communication interface 822 may also be used to perform and/or be a means for performing other steps and features set forth in the instant disclosure.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the identifying, monitoring, terminating, adding, clearing, deleting, removing, determining, and/or retrieving steps disclosed herein. Input device 828 may also be used to perform and/or be a means for performing other steps and features set forth in the instant disclosure.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810. In one example, deduplicated data system 120 from FIG. 1 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

In certain embodiments, storage devices 832 and 833 may be used, for example, to perform and/or be a means for performing, either alone or in combination with other elements, one or more of the identifying, monitoring, terminating, adding, clearing, deleting, removing, determining, and/or retrieving steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
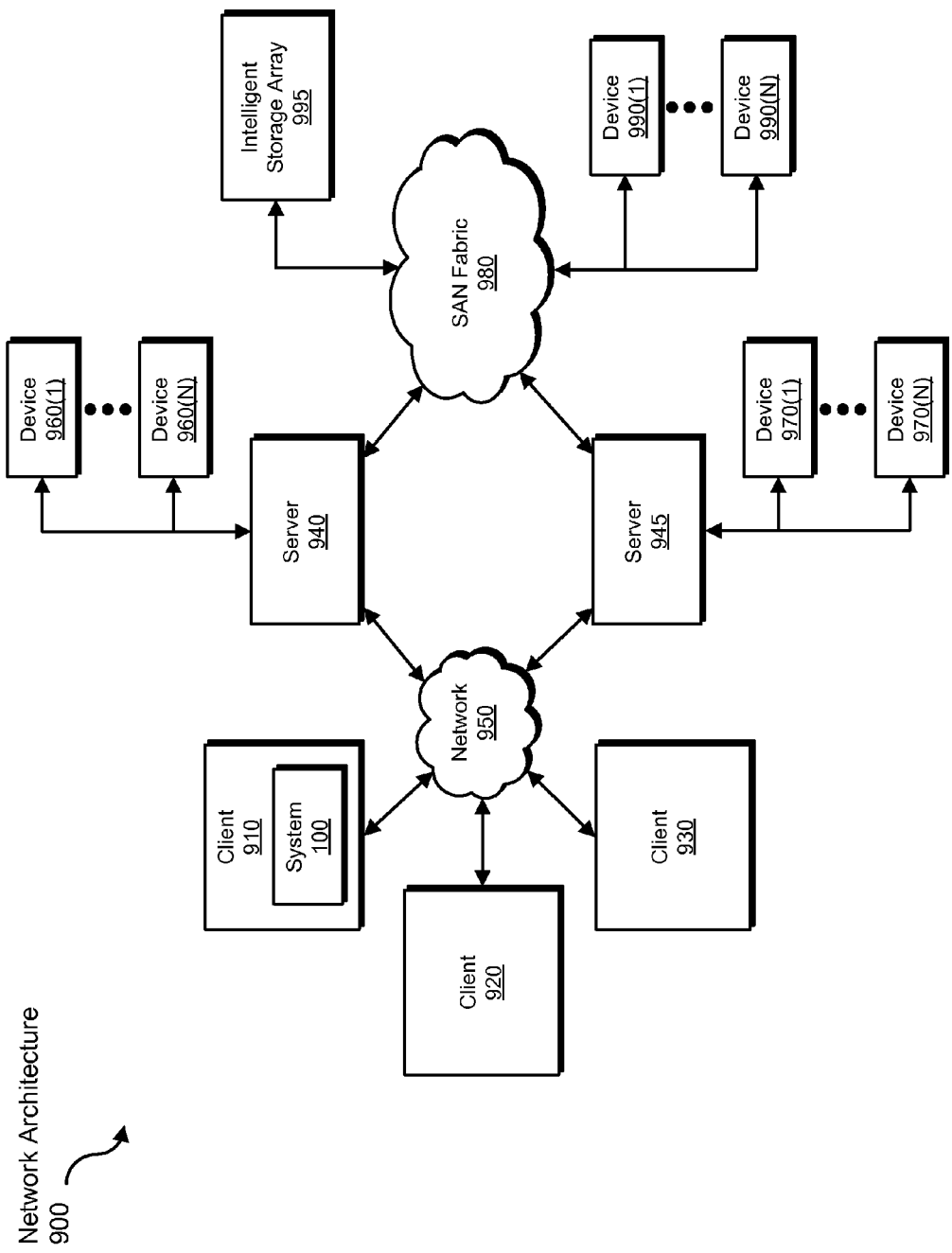
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8. In one example, client system 910 may include system 100 from FIG. 1.

Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for performing, either alone or in combination with other elements, one or more of the identifying, monitoring, terminating, adding, clearing, deleting, removing, determining, and/or retrieving steps disclosed herein. Network architecture 900 may also be used to perform and/or be a means for performing other steps and features set forth in the instant disclosure.

As detailed above, computing system 810 and/or one or more components of network architecture 900 may perform and/or be a means for performing, either alone or in combination with other elements, one or more steps of an exemplary method for garbage collection in deduplicated data systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing system into an efficient system for garbage collection for deduplicated data systems.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for garbage collection in deduplicated data systems, at least a portion of the method being performed by a computing device comprising at least one processor, the method comprising:
   identifying a deduplicated data system;
   identifying at least one segment object added to the deduplicated data system during a garbage-collection process of the deduplicated data system;
   locking the segment object to prevent removal of the segment object by the garbage-collection process;
   unlocking the segment object after the garbage-collection process.

2. The computer-implemented method of claim 1, wherein locking the segment object comprises adding a reference to the segment object to a locked segment object map.

3. The computer-implemented method of claim 2, wherein unlocking the segment object after the garbage-collection process comprises at least one of:
- clearing the locked segment object map;
- deleting the locked segment object map;
- removing the reference to the segment object from the locked segment object map.

4. The computer-implemented method of claim 1, wherein identifying the segment object added to the deduplicated data system comprises at least one of:
- identifying creation of the segment object within the deduplicated data system;
- identifying a new reference to the segment object within the deduplicated data system.

5. The computer-implemented method of claim 1, further comprising:
- identifying an additional segment object added to the deduplicated data system before the garbage-collection process;
- determining, as a part of the garbage-collection process, that the additional segment object is unreferenced within the deduplicated data system;
- removing the additional segment object based on the determination.

6. The computer-implemented method of claim 5, further comprising:
- identifying a data object added to the deduplicated data system after the additional segment object was added;
- determining that the data object references the additional segment object;
- retrieving another copy of the additional segment object.

7. The computer-implemented method of claim 1, wherein identifying the segment object added to the deduplicated data system during the garbage-collection process comprises monitoring the deduplicated data system for new data segments once the garbage-collection process begins.

8. The computer-implemented method of claim 7, further comprising terminating the monitoring of the deduplicated data system for new data segments once the garbage-collection process is complete.

9. The computer-implemented method of claim 1, further comprising:
- identifying at least one data object added to the deduplicated data system during the garbage-collection process;
- locking the data object to prevent removal of the data object by the garbage-collection process;
- unlocking the data object after the garbage-collection process.

10. A system for garbage collection in deduplicated data systems, the system comprising:
- an identification module programmed to:
  - identify a deduplicated data system;
  - identify at least one segment object added to the deduplicated data system during a garbage-collection process of the deduplicated data system;
- a locking module programmed to lock the segment object to prevent removal of the segment object by the garbage-collection process;
- an unlocking module programmed to unlock the segment object after the garbage-collection process;
- at least one processor configured to execute the identification module, the saving module, the supplying module, and the deletion module.

11. The system of claim 10, wherein the locking module is programmed to lock the segment object by adding a reference to the segment object to a locked segment object map.

12. The system of claim 11, wherein the unlocking module is programmed to unlock the segment object after the garbage-collection process by at least one of:
- clearing the locked segment object map;
- deleting the locked segment object map;
- removing the reference to the segment object from the locked segment object map.

13. The system of claim 10, wherein the identification module is programmed to identify the segment object added to the deduplicated data system by at least one of:
- identifying creation of the segment object within the deduplicated data system;
- identifying a new reference to the segment object within the deduplicated data system.

14. The system of claim 10, further comprising a garbage-collection module programmed to:
- identify an additional segment object added to the deduplicated data system before the garbage-collection process;
- determine, as a part of the garbage-collection process, that the additional segment object is unreferenced within the deduplicated data system;
- remove the additional segment object based on the determination.

15. The system of claim 14, further comprising a restoration module programmed to:
- identify a data object added to the deduplicated data system after the additional segment object was added;
- determine that the data object references the additional segment object;
- retrieve another copy of the additional segment object.

16. The system of claim 10, wherein the identification module is programmed to identify the segment object added to the deduplicated data system during the garbage-collection process by monitoring the deduplicated data system for new data segments once the garbage-collection process begins.

17. The system of claim 16, wherein the identification module is further programmed to terminate the monitoring of the deduplicated data system for new data segments once the garbage-collection process is complete.

18. The system of claim 10, wherein:
- the identification module is further programmed to identify at least one data object added to the deduplicated data system during the garbage-collection process;
- the locking module is further programmed to lock the data object to prevent removal of the data object by the garbage-collection process;
- the unlocking module is further programmed to unlock the data object after the garbage-collection process.

19. A computer-readable-storage medium comprising one or more computer-executable instructions that, when executed by at least one processor of a computing device, cause the computing device to:
- identify a deduplicated data system;
- identify at least one segment object added to the deduplicated data system during a garbage-collection process of the deduplicated data system;
- lock the segment object to prevent removal of the segment object by the garbage-collection process;
- unlock the segment object after the garbage-collection process.

20. The computer-readable-storage medium of claim 19, wherein locking the segment object comprises adding a reference to the segment object to a locked segment object map.

* * * * *